United States Patent Office 2,991,257
Patented July 4, 1961

2,991,257
ELECTRICALLY CONDUCTIVE COMPOSITIONS
AND THE PROCESS OF MAKING THE SAME
Robert Smith-Johannsen, Niskayuna, N.Y., assignor, by mesne assignments, to Chemelex, Inc., Niskayuna, N.Y., a corporation of New York
No Drawing. Filed Jan. 18, 1957, Ser. No. 634,821
7 Claims. (Cl. 252—506)

This invention relates to compositions of matter capable of being formed into electrically conductive structures and films and to the process of making the same. More particularly, the invention involves the formation of compositions of matter capable of being formed into electrically conductive structures and films by combining electrically conductive particles such as graphite together with a silica binder formed by precipitating silica in the presence of previously dispersed silica particles.

In order to produce an electrically conductive structure or coating, it is essential to disperse a suitable electrically conductive material throughout a non-conductive bonding or adhesive vehicle. The nature of the conductive material used and of the vehicles throughout which the conductive material is dispersed determines the electrical and physical properties of the resulting structure or film.

According to this invention, I employ a silica binder or adhesive vehicle for the conductive particles which is prepared by precipitating silica from a suitable source such as metal silicates and organo silicates in the presence of previously dispersed, relatively pure and fine silica particles such as silica aerogel. The conductive particles are mixed with the silica adhesive vehicle so prepared, or before its preparation, together with an aqueous vehicle to form the compositions of matter of this invention which are capable of being formed into conductive structures and films. This composition of matter or paint can then be formed into the desired structure or applied to a suitable base by any suitable means as a paint and dried to form the conductive compositions. The paint can be air-dried with or without heat. It is not necessary to bake the composition of this invention to form the conductive structures, but it is not detrimental.

The dried conductive structures or films produced according to this invention are porous and expanded. The porosity of the conductive films and structures permits the impregnation of the films with most any type of material desired capable of being impregnated therein. The fact that the films produced are porous also renders them flexible  The impregnation of the films with a resinous material imparts to the film substantially the properties of the resin impregnant itself. The coating compositions of this invention can be applied to suitable bases such as desized glass cloth, impregnated with a resin such as a silicone resin, and then wrapped about various shaped objects such as cylinders. The conductive films of this invention are not dependent on the resin impregnant as a binder and the electrical conductivity thereof is indepedent of the resin impregnant. If the resin impregnant is removed or burned out, the conductive film still remains and if desired may be re-impregnated. The conductive films are also unaffected by water or moisture. In fact, the conductive films can be immersed in water and operate while immersed therein.

According to my invention I employ a particular type of silica as a non-conductive adhesive bonding agent or carrier for the conductive particles. The particular silica bonding agent used according to this invention is formed by precipitating silica from a composition capable of precipitating silica in the presence of previously dispersed, relatively pure, finely divided silica particles. The finely divided, previously dispersed silica particles apparently act in a seeding nature. The precipitated silica appears to deposit in a very thin film fresh pure silica about the dispersed silica particles resulting in the production of silica particles of a different nature from, and having different properties than, either the dispersed silica or the precipitated silica.

The resulting silica particles so produced are irreversibly precipitable from the aqueous phase in which they are produced. By irreversibly precipitable, I mean that once the silica particles have been precipitated by various means such as by evaporating the aqueous dispersing phase, the silica particles can no longer be redispersed in water or organic media. In addition, the silica particles produced are not bound with alkali. Any alkali present in the aqueous dispersion of the silica particles would be substantially all outside the silica particles. Thus when conductive films are formed with the particular type of silica according to this invention, alkali is not intimately bound therewith rendering its removal impossible, but can easily be removed from the dried conductive films by washing them with water or other solvents.

In forming the conductive structures and films of this invention, I mix the electrically conductive particles with the silica particles and then irreversibly precipitate the silica, for example, by drying in situ in the desired form or on the desired base. The irreversible precipitation of the silica particles in the presence of the conductive particles results in the formation of a strong bond and prevents redispersion of the silica or conductive particles. The silica particles produced according to this invention and the conductive particles possess an affinity for each other in some manner. This affinity results in the production of a porous or expanded structure rather than a hard, dense structure.

Various compositions capable of precipitating silica can be used as the source of precipitated silica according to this invention.

One source from which silica can be precipitated in the presence of the previously dispersed silica or seeding silica is the product of controlled hydrolysis of esters of silicic acid such as various alkyl or aryl orthosilicates. Some examples of some esters of silicic acid which can be utilized are organo silicate compounds corresponding to the general formula:

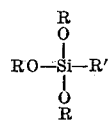

where R and R' are each a member selected from the class of alkyl groups and halogenated alkyl groups, and R' is in addition a member selected from the class consisting of aryl, aralkyl, alkaryl, alkoxy, aryloxy groups and halogenated derivatives of the above groups. R in the above formula may be the same or different alkyl groups and R' may also be the same or different alkyl groups. Ethyl silicates have been found to be particularly advantageous, such as tetraethyl orthosilicate. Some other specific examples are condensed ethyl silicate, and ethyl silicate 40, marketed by Carbide and Carbon Chemicals Company. These silicates, when hydrolyzed with water, produce silicic acid and an alcohol.

The organo silicates may be hydrolyzed in a number of different ways, such as those described in an article by Cogan and Setterstorm in "Chemical and Engineering News," September 25, 1946, and in "Industrial and Engineering Chemistry" vol. 39, No. 11, page 1364 (1947). All of the ethyl silicates hydrolyze slowly in the presence of water, but alkaline or acid catalysts greatly speed the reaction. Some examples of hydrolysis-inducing agents that I have used successfully are hydrochloric acid, ferric chloride, sodium hydroxide, sodium silicate, and sodium methyl siliconate. To best accomplish the hydrolysis, a mutual solvent such as alcohol or an emulsifying agent may advantageously be employed since the ethyl silicates and water are immiscible.

Another source from which the precipitated silica can be obtained is from sodium silicate or water glass. I have found that it is advantageous when using a sodium silicate as a source of precipitated silica to use as high as possible an alkali-silica ratio in the sodium silicate, such as a ratio of 1:3.2. The addition of the dispersed silica to the sodium silicate upsets the $Na_2O:SiO_2$ balance and causes the precipitation of fresh silica on the dispersed silica particle surfaces. The sodium silicate adsorbs onto the silica particles and becomes insolubilized owing to the new balance of $Na_2O$ and $SiO_2$.

Various forms and types of relatively pure, finely divided silica particles can be used according to this invention as seeds so long as they are effective in accomplishing the seeding action to produce the silica particles according to this invention. Some examples of silica particles which can be used as a dispersing or seeding silica include dehydrated silica gels, such as silica aerogel, marketed by the Monsanto Chemical Company under the trade name Santocel, and a vapor phase fumed silica.

Other fine silica particles can be used according to this invention as the dispersed silica or seeding silica as well as other sources of precipitative silicas as specifically disclosed herein as will be apparent to those skilled in the art.

The silica particles used as seeding silica cannot be used themselves to form the conductive structures and films of this invention. They are not irreversibly precipitable and will not in themselves produce an effective bond together with the conductive particles. The same thing is true of the compositions disclosed herein from which the precipitated silica can be obtained. Sodium silicate will, however, alone form a binder or adhesive bond for the conductive particles. The use of sodium silicate as a binder, however, is not practical. Films produced using sodium silicate as a binder are hard and dense and when a potential is applied thereto they run away and burn out at fairly low temperatures and are also very unstable in the presence of moisture. A dispersed silica formed by precipitating silica from a sodium silicate in the presence of a previously dispersed, fine silica forms an excellent bond and a porous and flexible structure which can be run at temperatures as high as 600° F. and above without runaway or burnout, and the bonding between the particles will withstand soaking in water. Conductive films formed by the direct precipitation of silica from an organo silicate are also very dense and hard and non-porous. When conductive films are formed from silica precipitated from organo silicate with the previously dispersed silica according to this invention, the films formed therefrom are porous and flexible.

The bonds between the conducting particles according to this invention are through the particles themselves rather than through continuous deposits from a solution.

I have also found that an improved electrically conductive composition can be produced by using Ludox colloidal silica by dispersing with the Ludox a conductive material, such as graphite, the relatively pure, finely divided seeding silica particles which are in themselves not sufficient to form a strong bond with the conductive particles such as silica aerogel and vapor phase silica.

The colloidal silica used as a non-conductive, adhesive bonding agent or carrier for the conductive particles in the composition of the present invention is a unique material and does not resemble any other common inorganic colloidal dispersion. Such a colloidal silica is marketed under the trade name Ludox by E. I. du Pont de Nemours and Company. The Ludox colloidal silica generally marketed is composed of 29 to 31% $SiO_2$, 0.29 to 0.39% $Na_2O$ and a maximum of 0.15% sulfates as $Na_2SO_4$, and is obtainable in the form of a water slurry containing about 30% solids. The silica particles are extremely small, ranging from about 0.01 to 0.03 micron in maximum dimension. The colloidal dispersion has an insolubilizing action on water soluble substances, such as water soluble synthetic resins. Another very important property of such a colloidal silica is that the silica is irreversibly precipitated. Once the colloidal silica is dispersed, in water for example, and dried, it becomes irreversible and cannot be redispersed.

Ludox colloidal silica and the method of making it is described in detail in U.S. Patents Nos. 2,244,325 issued June 3, 1941, 2,574,902 issued November 13, 1951, and 2,597,872 issued May 27, 1952. These patents further describe Ludox colloidal silica as a stable aqueous silica sol generally having a silica-alkali ratio from about 60:1 to 130:1 containing discrete silica particles, having a molecular weight, as determined by light scattering of more than one-half million. It has a relative viscosity, at 10 percent $SiO_2$, from 1.15 to 1.55 and generally contains from 20 to 35 percent by weight of $SiO_2$. The silica-alkali ratio of Ludox silica is calculated as $Na_2O$ and may be as low as 10:1 but it is advantageous to use a Ludox silica containing a silica-alkali ratio of between about 60:1 to 130:1. The silica-alkali ratio makes it obvious that the silica and alkali are combined in a special manner not found in conventional metal alkali silicates since the latter cannot be prepared in a form soluble and stable in aqueous solutions at ratios above 4:1. The alkali present is not uniformly distributed throughout the $SiO_2$ particles as it is in conventional silicate such as water glass but is substantially all outside the $SiO_2$ particles. The alkali is present as a stabilizer for the $SiO_2$ sol and prevents condensation of the $SiO_2$ particles. The Ludox silica sols could be prepared and used in the absence of alkali but this is not practical because they gel up very rapidly and cannot be stored.

Ludox colloidal silicas are generally prepared by passing a silicate through an ion exchange resin to remove the alkali as described in United States Patent No. 2,244,325. If all of the alkali is removed from the silicate, the resulting sols are not stable, but they can be stabilized by adding a small amount of alkali such as $Na_2O$ or $K_2O$.

It is also particularly advantageous to use Ludox silica having a particle size of less than 30 millimicrons (0.03 micron), although the particles of Ludox may be of colloidal dimensions, that is, particles having an average size not exceeding 100 millimicrons (0.1 micron) nor less than about 1 millimicron (0.001 micron). The particle size of Ludox colloidal silica is determined as the average size of particle present when the solution is diluted to about 0.1% $SiO_2$ with water and dried in a very thin layer deposit as described in the above-mentioned patent.

It is also advantageous to use a Ludox silica containing between about 29–30 present $SiO_2$ although higher and lower amounts can be used. Stable Ludox silica sols containing 5 to 15 percent $SiO_2$ can be prepared according to the United States Patent No. 2,244,325, while the more advantageous Ludox silica sols containing 20 to 35 percent by weight $SiO_2$ can be prepared according to the United States Patent No. 2,574,902. For a further and more detailed description of Ludox colloidal silica and to the method of making it, the above patents may be referred to.

The types of silica, such as the Ludox silica above described, can be used themselves to form expanded and porous conductive films having the advantages of the conductive films herein described. The use of a Ludox-type colloidal silica is described and claimed in my copending application Serial No. 351,731, filed April 28, 1953, now U.S. Patent No. 2,803,566.

Applied electrically conductive films produced according to this invention may at times contain impurities or salts, such as sodium sulfate, sodium hydroxide, sodium carbonate, and the like depending upon the method used to prepare them. I have found that the presence of even a trace of such impurities adversely affects the chemical and electrical properties of the films, and that these impurities can be washed out of the films after they have been dried and set. The resulting washed films are neutral, and may be subjected to higher temperatures without adversely affecting the physical or electrical properties of the films than films containing even a small amount of impurities. Usually it does not make any difference in the resulting films whether these impurities are removed before or after the formation of the films, although it is advantageous to remove them after the film has been applied. The improved results as noted flow from the neutral condition of the compositions comprising the activated non-redispersible silica adhesive vehicle and conducting particles of the present invention. However, the resulting films are still further improved when zinc is used in the compositions if these impurities are not removed from the compositions of the present invention until after the film has been applied, as will be hereinafter discussed in more detail.

I have also found that the electrical and physical properties of the films of the present invention, especially in high temperature stability, can be obtained by incorporating china clay or zinc dust in the compositions. The addition of china clay (Georgia kaolin) or zinc dust raises the watt densities at which the films may be operated while maintaining a conductivity of between about 10 and about 100 ohms per square inch of surface and causes a reduction in arcing and burnouts at high temperature. With the use of zinc dust or china clay, the resulting films can withstand much higher temperatures for a considerably longer time than was heretofore possible. The china clay or zinc dust may be usefully incorporated in proportions of from about 12 percent to about 48 percent by weight where the remaining ingredients are graphite and activated silica. I have found, however, that it is advantageous to incorporate the zinc dust or china clay in approximately equal parts by weight with the graphite or other conductive material.

I have further found that the addition of zinc dust to the compositions of the present invention is even more advantageous if the composition, after it has been applied to an insulating surface and irreversibly set, is washed with water to remove any alkali or acid, such as $Na_2SO_4$, NaOH, and $Na_2CO_3$, present in the dried film. As hereinbefore pointed out, china clay or zinc dust may be advantageously utilized in my compositions regardless of whether or not the films are washed free of salts, alkali, or acids, after they have been set, with improved results. If the composition is applied to a support with china clay as an additive, the subsequent washing of the films to remove the impurities present will result in a film having improved electrical and physical characteristics. However, if the composition contains zinc dust, the subsequent washing thereof greatly improves the electrical and physical properties of the resulting films, even over washed films containing china clay. The films, after removal of the salts by washing with water, are neutral and this substantial improvement by the incorporation of zinc dust is effective only in neutral compositions. As noted above, a distinct advantage is obtained if the compositions of the present invention employing zinc dust are washed to remove the alkali salts or other interfering impurities after the film has been applied, or after the zinc has been added to the composition, rather than before application of the film. The removal of these impurities after the film has been established results in a film having improved electrical and physical properties as compared with film which is rendered neutral prior to the addition of the zinc dust. I am not aware of the exact reason for this improved result, but it appears to stem from the fact that the presence of the alkaline impurities causes some of the zinc to go into solution before the film is established. If the organo silicates are hydrolyzed without the use of a catalyst, the compositions will be neutral and it will not be necessary to wash the dried film. However, if a catalyst is employed, a slight washing of the dried film will render the film neutral. The advantages gained through the use of zinc dust in the compositions of the present invention and the subsequent washing of the dried films to free them of alkali or acids, are also present when sodium silicate and dispersed silica, or colloidal Ludox silica are used as the adhesive vehicle. When zinc is used, the preferred colloidal activated silica is hydrolyzed ethyl silicate.

The addition of zinc dust to the compositions above described and in the manner described prolongs the life of the films both at high and low operating temperatures. The zinc dust prevents the oxidation of the graphite at high temperatures, and in doing so appears to act as a reducing agent. Oxidation of the graphite has been noticed as slowly taking place at about 750° F. which causes the conductivity of the films to gradually fall off. The zinc dust permits operating temperatures far in excess of 750° F. without any noticeable oxidation of the graphite or reduction in the conductivity of the film. The addition of zinc dust also greatly aids the coefficient of resistance of the film at high temperatures, so that any tendency to "run away" is completely eliminated and uniform temperatures over the entire surface may be maintained up to 1500° F. The films permit watt density power inputs far in excess of that heretofore possible. I have maintained watt density of up to 58 watts per square inch of surface in still air without cooling. At these temperatures no arcing or burnout occurs.

In adding the zinc dust to the compositions of the present invention, it was found that the compositions tended to gel up and the films formed from the fresh solutions cracked badly. I have found, however, that if a mixture of activated silica and electrically conductive material such as graphite is first stabilized with a dispersing agent before the addition of the zinc dust, the gelling up or agglomeration of the composition is greatly delayed and smooth, even films may be readily applied which will not crack or be otherwise impaired in their practical and advantageous uses.

An advantage of the conductive compositions of this invention is that they can be impregnated with various resinous materials. The impregnation of the film increases their strength and adds surface insulation to them without raising the resistance of the films to any significant extent, if at all. The films when impregnated with solutions of natural or synthetic resinous materials will, of course, have an operating temperature limited to the operating temperature of the particular resin used to impregnate them. Films made in this manner by impregnating the dried conductive films are far stronger and tougher than films made by dispersing the conductive activated silica composition directly in the resin. Impregnating such films with various resinous materials does not affect the very strong and tough bond between the particles of electrically conductive material nor disrupt the electrical conducting paths established during the initial drying which constitute the electrical circuit. The bonds between the particles making up the composition and with the insulating surface to which the compositions are attached are not infiltrated or weakened by the resin or solvent.

A wide variety of resinous materials may be used for impregnating the films. Various natural or synthetic resins commonly used in protective coatings or paints such as phenolic resins, alkyl resins, thermoplastic vinyl resins and the like may be utilized if desired. However, silicone resins have been found to be particularly advantageous. Silicone resins containing alkyl or aryl groups, or both, such as polymethylsiloxane, dimethylsiloxane, diethylsiloxane, methylethylsiloxane, phenylsiloxane, methylphenylsiloxane, and the like are some examples. Blends of resins can also be used if desired. The choice of resin depends largely upon the desired flexibility of the film and the operating temperature desired.

In the examples and discussion with respect to the use of organo silicate, any other organo silicate which may be hydrolyzed to produce the highly activated irreversibly precipitated silica may be substituted for the particular organo silicate stated. Partially hydrolyzed organo silicates may also be utilized as the starting silicate. The partially hydrolyzed organo silicates are also advantageous in that they offer less possibility of liquid separation and generally make possible the preparation of compositions having a higher active silica content. Also noted in the examples pertaining to hydrolyzed organo silicates, the composition should stand for a sufficient time to permit hydrolysis of the organo silicates before the film is applied. The time for this hydrolysis to take place sufficiently for the silica to become irreversibly precipitable will vary, dependent upon the amount and type of hydrolysis-inducing agent or catalyst used. The hydrolysis of the organo silicates with an alkaline catalyst is usually very fast, and it is not necessary to wait any appreciable time before applying the film. The hydrolysis-inducing agent is usually added to the formulations in amounts from about 0.1 percent to about 0.2 percent of the amount of organo silicate used.

Acheson graphite has been found to be particularly advantageous as an electrically conductive material in making low-temperature, conductive compositions; however, other electrically conductive materials may be used according to this invention. Some examples of suitable electrically conductive materials that may be used are colloidal or semi-colloidal graphite, finely divided graphite powder, graphite flakes, and the like. Combinations of electrically conductive materials may also be used.

The Triton X-100 emulsifier, which is a non-ionic water soluble alkyl aryl polyether alcohol, may be replaced in the examples, if desired, by other suitable emulsifying agents, or by an alcohol such as ethyl alcohol. If alcohol is used, it should be added in a sufficient amount to produce a single phase. The purpose of the addition of the emulsifying agent or alcohol is to bring the reactants into close enough proximity to allow hydrolysis to proceed rapidly. Some examples of other emulsifying agents which may be utilized are Turkey red oil (sulfonated castor oil), triethanolamine, and also acetic acid salts of high molecular weight aliphatic amines.

The amount of dispersed or seeding silica that can be employed can be varied considerably without destroying the basic advantageous properties of the resulting conducting films. The amount of dispersed silica will also vary according to the surface area of the dispersed silica. The proportions of the organo silicates, sodium silicates, and Ludox silica, and the dispersed or seed silica are given on a wet basis. On a dry basis, it is preferred to employ about 3 to 5 parts by weight of the organo silicates, sodium silicate, or Ludox silica to 1 part of the dispersed or seed silica. The above proportions, however, are not critical as the proportions may be varied in both directions without destroying the resultant conducting films. It is also preferable, when employing a dispersed silica such as silica aerogel, to employ a 5 percent dispersion in water. The percent dispersion may, of course, be varied as desired; however, dispersions of about 10 percent and above become quite thick and are difficult to handle.

The proportions of electrically conductive material which can be dispersed throughout the compositions according to this invention can vary within fairly wide limits. For example, when graphite is present in amounts of about 60 percent or less based on the total solid content in the mixture, good electrical conductivity and physical properties result. When the graphite percentage is reduced to about 25 percent and below, the conductivity of the composition falls off somewhat. It has been found that the most advantageous range of graphite is about 29 percent to about 51 percent. These limitations, however, are not to be considered critical, for the graphite concentration may fall outside these limits, dependent upon the degree of conductivity desired and the presence of other materials in the mixture in addition to the graphite and silica. It is desirable to have and maintain a surface resistance of between 10 and 100 ohms per square inch in the films and the concentrations of the electrically conductive material can be sufficient to obtain a resistance within that range. The nature of the electrically conductive material chosen will also affect the electrical conductivity of the resulting films and also the proportions of electrically conductive material which will be necessary to achieve the desired electrical conductivity.

The conductive compositions of this invention can be applied to, or used to impregnate, any desirable electrical insulating surface intended as a support for the conductive films in any conventional manner such as by spraying, brushing, or dipping. Some examples of insulating materials to which the films may be advantageously applied are asbestos board, glass fiber cloth, paper, and the like. The films, when applied to suitable non-conductive supports, are useful as heating elements in toasters, electric irons, electric stoves and the like.

The following examples set forth some of the various alternatives which can be used in practicing this invention. All parts are by weight.

*Example 1*

| | |
|---|---|
| Ethyl silicate 40 (Carbide and Carbon Chemicals Corporation) | 4 |
| 5% silica aerogel dispersed in water | 11 |
| Water | 10 |
| Triton X-100 (Rohm & Haas Company emulsifier) | 1 |
| Acheson graphite | 5 |
| 30% sodium methyl siliconate in water | 1 |

The ethyl silicate was first mixed with the Triton X-100 emulsifier and the water to form an emulsion. To this emulsion the graphite was then added, followed by the silica aerogel and finally the sodium methyl siliconate hydrolysis agent was added to complete the composition. The mixture was then permitted to stand for a sufficient time for hydrolysis of the ethyl silicate to take place, and the resulting dispersion was then applied to both an asbestos board and a glass cloth support. Once the composition had air dried, it was found that it did not lose its initial electrical conductivity even after soaking it in water or impregnating it with a soluble resin. The dispersion was also found to have good shelf life.

*Example 2*

| | |
|---|---|
| Partially hydrolyzed ethyl silicate | 11.4 |
| Water | 25.0 |
| 5% silica aerogel in water | 33.0 |
| Emulsifying agent (Triton X-100 or alcohol) | 0.6 |
| Graphite | 14.0 |
| 20% sodium methyl siliconate in water | 2.0 |

The above components were prepared and coated on a glass cloth support in the same manner as set forth in Example 1. The resulting conductive film had substantially the same properties as set forth in Example 1.

Example 3

| | |
|---|---|
| Sodium silicate (20% water solution, alkali-silica ratio 1:3.2) | 10 |
| 5% silica aerogel dispersed in water | 10 |
| Acheson graphite | 5 |
| China clay | 5 |

In compounding the above ingredients, a slurry was made of the silica aerogel in water and run through a colloid mill to reduce the gel to its ultimate particles. To this was then added the 20 percent solution of sodium silicate. The conductive particles, in this case Acheson graphite, were then introduced into the mixture and thoroughly dispersed along with the china clay stabilizing agent. The resulting dispersion was stable and had good shelf life. The composition was deposited on an asbestos surface and dried at room temperature. It could not be redispersed in water or organic media. In this composition of sodium silicate no acid, alkali, or other agent need be added to cause insolubilization or activation of the silica. The china clay is present as a high temperature stabilizing agent, and although the clay is not necessary to produce the electrically conductive film, its presence is highly advantageous as will be hereinafter pointed out.

Example 4

Another example in parts by weight of the sodium silicate dispersed silica composition is as follows:

| | |
|---|---|
| Sodium silicate (20% solution in water, alkali-silicon ratio 1:3.2) | 33 |
| 5% silica gel dispersed in water | 33 |
| Acheson graphite | 17 |
| China clay | 17 |

The above composition was found to have good stability on asbestos board at 17 watts per square inch, with no cooling. No burnout or arcing occurred at 40 watts per square inch, but a slow loss in conductivity was observed at about 40 watts.

Example 5

| | |
|---|---|
| Colloidal silica Ludox (30% solids) | 44 |
| 5% silica gel dispersed in water, Santocel | 44 |
| Fine graphite powder | 12 |

The above components after being thoroughly mixed together to form a paint were coated on an asbestos board base and the resulting conductive film had all the properties and advantages herein set forth.

Example 6

| | |
|---|---|
| Partially hydrolyzed ethyl silicate | 11.4 |
| Water | 25.0 |
| 5% dispersed silica gel in water | 53.0 |
| Emulsifying agent | 0.6 |
| Graphite | 14.0 |
| Zinc dust | 14.0 |
| Sodium methyl silicate 20% in water | 2.0 |

The above components were mixed by first adding the water and the emulsifying agent to the ethyl silicate and the silica gel. The graphite and zinc dust were then added and finally the hydrolysis catalyst, sodium methyl silicate. After the mixture was allowed to stand for a sufficient time to permit the ethyl silicate to further hydrolyze, it was applied to a glass cloth by dipping. The composite electrically conductive article showed good stability at 14 watts per square inch without cooling, and was able to withstand a watt density of up to 43 watts per square inch without failure.

Example 7

| | |
|---|---|
| Ethyl silicate 40 (Carbide and Carbon Chemical Company) | 4.0 |
| Water | 10.0 |
| 5% silica gel dispersed in water | 11.0 |
| Triton X-100 emulsifier (Rohm & Haas Company) | 1.0 |
| Acheson graphite | 5.0 |
| Marasperse CB dispersing agent (Marathon Corporation) | 0.5 |
| Zinc dust | 5.0 |
| 30% sodium methyl siliconate in water | 1.0 |

The ethyl silicate, water and emulsifying agent were first mixed to form an emulsion and then the silica gel was added. The dispersing agent was next added and subsequently the graphite and zinc dust. The alkaline hydrolysis agent, sodium methyl siliconate, was then added to complete the mixing. The resulting dispersion had good shelf life. The composition was applied to a glass cloth insulating surface, dried, and then washed with water until neutral. The film did not lose its initial conductivity even upon soaking it in water or by impregnating it with a soluble resin. Upon subjecting the film to a watt density of 58 watts per square inch and to a temperature of 1500° F., the film showed no signs of running away, arcing, or burnout. The film at this temperature maintained a uniform temperature over the entire area and no loss of adhesion was noticed. Aside from the Marasperse dispersing agent, which is a lignin sulfonic acid compound, other dispersing agents suitable to effect a good dispersion of the zinc dust, such as polymerized organic salts of alkyl, aryl, sulfonic acids and the reaction products of unsubstituted amides with ethylene oxide, may also be used.

In the above examples, the electrical potential difference was applied across a pair of copper electrodes to produce an electrical current through the conductive material. The electrodes were applied to the conductive material by placing them in contact therewith and adhering them by painting with a solution of the conductive paint of this invention. The electrical potential and the electrodes can also be applied by other various means as will be apparent to those skilled in the art.

This application is a continuation-in-part of my application Serial No. 390,433, filed November 6, 1953, now abandoned.

I claim:

1. A composition capable of being formed into electrically conductive structures and films comprising an aqueous dispersion of between about 3 and 5 parts by weight of at least one member of the group consisting of a hydrolyzable organo silicate and a sodium silicate, about 1 part by weight of at least one member of the group consisting of silica aerogel and vapor phase silica and particles of electrically conductive material in a sufficient amount to render the composition electrically conductive when dried.

2. The composition of claim 1 in which the electrically conductive material is graphite.

3. The composition of claim 1 in which zinc dust is also dispersed.

4. The composition of claim 2 which is neutral.

5. The composition of claim 4 which is neutral.

6. The method of forming a composition capable of being formed into electrically conductive structures and films which comprises forming an aqueous solution of between about 3 and 5 parts by weight of at least one member of the group consisting of hydrolyzable organo silicates and sodium silicates, about 1 part by weight of at least one member of the group consisting of silica aerogel and vapor phase silica and particles of electrically conductive materials in a sufficient amount to render the composition electrically conductive when dried, and precipitating the silica from said compositions in the presence of the dispersed silica and the electrically conductive material while maintaining the composition in the aqueous state.

7. The method of claim 6 in which the electrically conductive material is graphite.

References Cited in the file of this patent

UNITED STATES PATENTS

| | | |
|---|---|---|
| 1,232,843 | Rice | July 11, 1917 |
| 1,422,130 | Reynolds | July 11, 1922 |
| 1,499,693 | Reynolds | July 1, 1924 |
| 1,714,165 | Gilbert | May 21, 1929 |
| 1,821,022 | Morse | Sept. 1, 1931 |
| 2,244,325 | Bird | June 3, 1941 |
| 2,496,736 | Maloney | Feb. 7, 1950 |
| 2,574,902 | Bechtold | Nov. 13, 1951 |
| 2,597,872 | Iller | May 27, 1952 |
| 2,785,051 | Miller | Mar. 12, 1957 |
| 2,803,566 | Smith-Johannsen | Aug. 20, 1957 |

UNITED STATES PATENT OFFICE
CERTIFICATE OF CORRECTION

Patent No. 2,991,257                          July 4, 1961

Robert Smith-Johannsen

It is hereby certified that error appears in the above numbered patent requiring correction and that the said Letters Patent should read as corrected below.

Column 4, line 60, for "present" read -- percent --; column 5, lines 1 and 2, for "April 28. 1953" read -- April 28, 1953 --; column 9, line 29, for "silicon" read -- silica --; column 10, line 57, for "3. The composition" read -- 4. The composition --; line 59, for "4. The composition" read -- 3. The composition --.

Signed and sealed this 5th day of December 1961.

(SEAL)
Attest:

ERNEST W. SWIDER
Attesting Officer

DAVID L. LADD
Commissioner of Patents
USCOMM-DC